United States Patent [19]

Webb et al.

[11] Patent Number: 5,014,583
[45] Date of Patent: May 14, 1991

[54] PUSH FEED SYSTEM FOR A SAW

[76] Inventors: William J. Webb, 35B Warminster Rd., Bathampton, Bath BA3 6SY, England; Stoddard H. Pyle, 3955 SW. Brooklane Dr., Corvallis, Oreg. 97333

[21] Appl. No.: 399,967
[22] Filed: Aug. 29, 1989
[51] Int. Cl.⁵ .............................................. B26D 7/06
[52] U.S. Cl. .................................... 83/76.9; 83/276; 83/437
[58] Field of Search ..................... 83/76.1, 76.6, 76.7, 83/76.8, 76.9, 369, 276, 437

[56] References Cited

U.S. PATENT DOCUMENTS

| | | | |
|---|---|---|---|
| 3,174,370 | 3/1965 | Thumim | 83/76.1 |
| 4,727,787 | 3/1988 | Schlosser | 83/369 |
| 4,848,532 | 7/1989 | Lauffer | 83/437 |
| 4,866,630 | 9/1989 | Beaman et al. | 364/474.02 |

FOREIGN PATENT DOCUMENTS

| | | | |
|---|---|---|---|
| 2823049 | 11/1979 | Fed. Rep. of Germany | 83/71 |
| 3143944 | 6/1983 | Fed. Rep. of Germany | 83/437 |
| 0163822 | 12/1981 | Japan | 83/369 |
| 1438233 | 6/1976 | United Kingdom | 83/71 |

Primary Examiner—Douglas D. Watts
Assistant Examiner—John M. Husar
Attorney, Agent, or Firm—Kimmel, Crowell & Weaver

[57] ABSTRACT

A push feed system for feeding articles from one position to another, and particularly for feeding pieces to be cut to a jump saw, includes a computer-controlled drive means having a stepper motor connected to drive a double sided toothed belt in engagement with a toothed rack, whereby operation of the belt causes relative movement between the belt and the rack, and a push bar connected to be driven by the drive means. The double sided toothed belt ensures transmission of a large amount of power without slippage, and the computer is programmed to correct for minor differences between a selected cut length and a measured cut length as might be caused, for example, by the dimension of material removed by the saw. A shock absorber is positioned between the push bar and the drive means to absorb impacts between the push bar and stationary pieces. In one form of the invention, the rack is made of a stretchable material and is mounted via a longitudinal adjustment at one end whereby the rack may be stretched longitudinally to adjust the set point of the drive means.

24 Claims, 10 Drawing Sheets

PUSH FEED SYSTEM FOR A SAW

FIELD OF THE INVENTION

This invention relates generally to push feed systems for feeding material from one location to another. More specifically, the invention relates to a push feed system for accurately feeding pieces of lumber or the like to wood working machinery, such as a jump saw.

DESCRIPTION OF THE PRIOR ART

Various devices are known in the prior art for feeding material from one location to another, including those which simply advance materials along a conveyor system, and those which advance materials a predetermined distance to a work station so that work can be performed on the material. Examples of some prior devices are shown in U.S. Pat. Nos. 2,657,784 and 3,601,166.

In the wood working industry, length measurements are typically made either by marking the piece to be cut or by using a stop set at some desired distance from the cutting device and then advancing the piece to be cut until it engages the stop, after which the piece is cut. This process is followed, for instance, in the furniture, pallet and joinery industries. These components must be accurately cut, and the use of conventional methods, particularly when a large number of pieces are involved, requires an inordinate amount of time or may even lead to errors and wasted materials.

There is thus a need for a simple and effective system for quickly and easily making a large number of cuts accurately, and which can be quickly and easily programmed for cutting different sizes of material.

SUMMARY OF THE INVENTION

Accordingly, it is an object of the present invention to provide a push feed system for accurately advancing a plurality of successive articles a predetermined distance each time.

Another object of the invention is to provide a push feed system for advancing pieces to be cut to a cutting tool, wherein the system is controlled such that compensation is automatically made for the dimension of material removed by the cut.

A further object of the invention is to provide a push feed system for supplying articles to a work station, wherein a non-slip drive means is connected between a pusher bar and a drive motor.

A still further object is to provide a push feed system for advancing articles to a work station, wherein the push feed system includes a drive means operable so as to decelerate its rate of advancement toward the end of its travel, thereby preventing excessive advancement of the article due to inertia.

Yet another object of the invention is to provide a saw for making identical cuts in successive work pieces advanced to the saw, wherein the saw includes an infeed table and a guide fence, the table and fence being inclined to the horizontal so that gravity holds the work pieces on the table and against the fence for proper alignment with the saw.

An even further object of the invention is to provide a push feed system for advancing successive work pieces to a work station, wherein a pusher bar engages the work piece, and the pusher bar is connected to a drive means through a yieldable shock absorber which absorbs the shock of the pusher bar impacting against stationary work pieces.

These and other objects are accomplished in the present invention, wherein a unique push feed system is employed in association with a jump saw for quickly and accurately supplying work pieces to the saw for cutting or trimming the pieces to a desired length. The push feed system and saw of the invention are controlled by a control system preferably comprising a computer using specialized software that enables calibration of the system at start up by moving the carriage to the datum reference point for zero calibration and datum offset, if desired; and that enables entry into the computer of: the desired lumber length or lengths; push feed offset; saw blade width; and a specified trim cut at the leading and/or trailing end of the lumber. In addition, the acceleration and/or deceleration rate of the push feed drive system may be made adjustable from the computer keyboard so that pieces will not overshoot their intended stopping location due to the inertia of their forward movement, thereby eliminating the need for a lumber gripper on the end of the push feed bar. In some instances, however, a gripper may be necessary. Such instances might include the use of the apparatus in the upgrading of lumber by removing a defect, in which, for example, the defect would be positioned underneath the cut-off saw blade. To minimize waste, it is desireable to move the work piece backwards if the work piece has been advanced too far. Another application might include those instances in which the push feed system is used in association with a machining center in which two or more tools are used to perform operations on the work piece. The tools in such apparatus need not be at the same location but may be positioned at different locations along the path of travel of the work piece.

At start-up, the software for the drive system causes the push bar to move to the work table. When the push bar reaches the cut-off saw, a datum switch is simultaneously activated, establishing a zero reference point. The datum switch activation can be manually set so that zero datum reference occurs when material is in a position to be cut off by the right side of the saw blade. The upper saw blade guard also functions as a work-piece clamp which clamps the material on both sides of the saw blade. Because the material clamp may clamp the push bar rather than the work piece, a datum offset can be entered into the computer to keep the push bar a specified distance away from the saw blade and clamp.

The push feed system of the invention includes a stepper motor connected through a suitable drive to a pusher bar which engages the work piece to advance it to the saw. The drive preferably comprises a double-sided toothed belt which engages with one of its sides against a correspondingly toothed rack connected to the pusher bar through a movable carriage that is guided on a guide rail by support rollers and guide rolls. The other side of the toothed belt is engaged by toothed drive wheels. This arrangement ensures the transmission of a large amount of power without slippage. Yieldable shock absorbing means is preferably connected between the pusher bar and the drive means to absorb the shock of impacting the pusher bar against a stationary work piece, and when the resistive force exceeds a predetermined amount, a switch is activated to disable the drive means.

In a preferred form of the invention, calibration of the system at start-up is accomplished by operating the drive system to cause the push bar to move toward the cut-off saw. When the push bar reaches the cut-off saw, an adjustable contact rod mounted on the push bar carriage frame activates a switch mounted on the saw frame providing a signal that stops futher movement of the push bar carriage toward the cut-off saw. The push bar carriage then starts moving away from the cut-off saw. At the moment the switch deactivates, the zero reference point is established, thus avoiding making the datum reference a function of the push bar carriage speed. The rack is manufactured with a specific number of teeth per unit of measure. Based upon the number of teeth on the stepper motor sprocket and on the coupling belts, a specific number of steps of the stepper motor will move the push bar carriage a specific distance along the infeed table. Variations in the manufacture of the number of teeth per unit length of the rack can be compensated for by one or both of two different methods. According to one method, the rack can be stretched within certain limits, thereby varying the spacing of the teeth. In another method, the computer is used for correction by positioning the push bar at a specific distance from the cut-off blade, then cutting the material off. Next, the remaining material is moved toward the saw a specified distance and the material is again cut off. The actual length of the material between these two cuts is compared with the distance indicated by the computer program. If there is any discrepancy, a ratio correction factor becomes a part of the drive system program. A further part of the set-up program includes entry of the width of the saw blade. Thus, each time the saw blade cuts through the lumber, the saw blade width is subtracted from the remaining length of lumber, whereby each successive piece is cut to exactly the same length.

The saw of the invention includes an infeed table on which the work piece is supported, and a fence at one side of the table against which the work piece is guided. The table and fence are inclined to the horizontal so that gravity holds the work piece flat on the table and against the fence as the work piece is advanced through the work station.

BRIEF DESCRIPTION OF THE DRAWINGS

The foregoing and other objects and advantages of the invention will become apparent from the following detailed description when considered in conjunction with the accompanying drawings, wherein like reference characters designate like parts throughout the several views, and wherein.

DETAILED DESCRIPTION OF THE PREFERRED EMBODIMENTS

Figure 1:
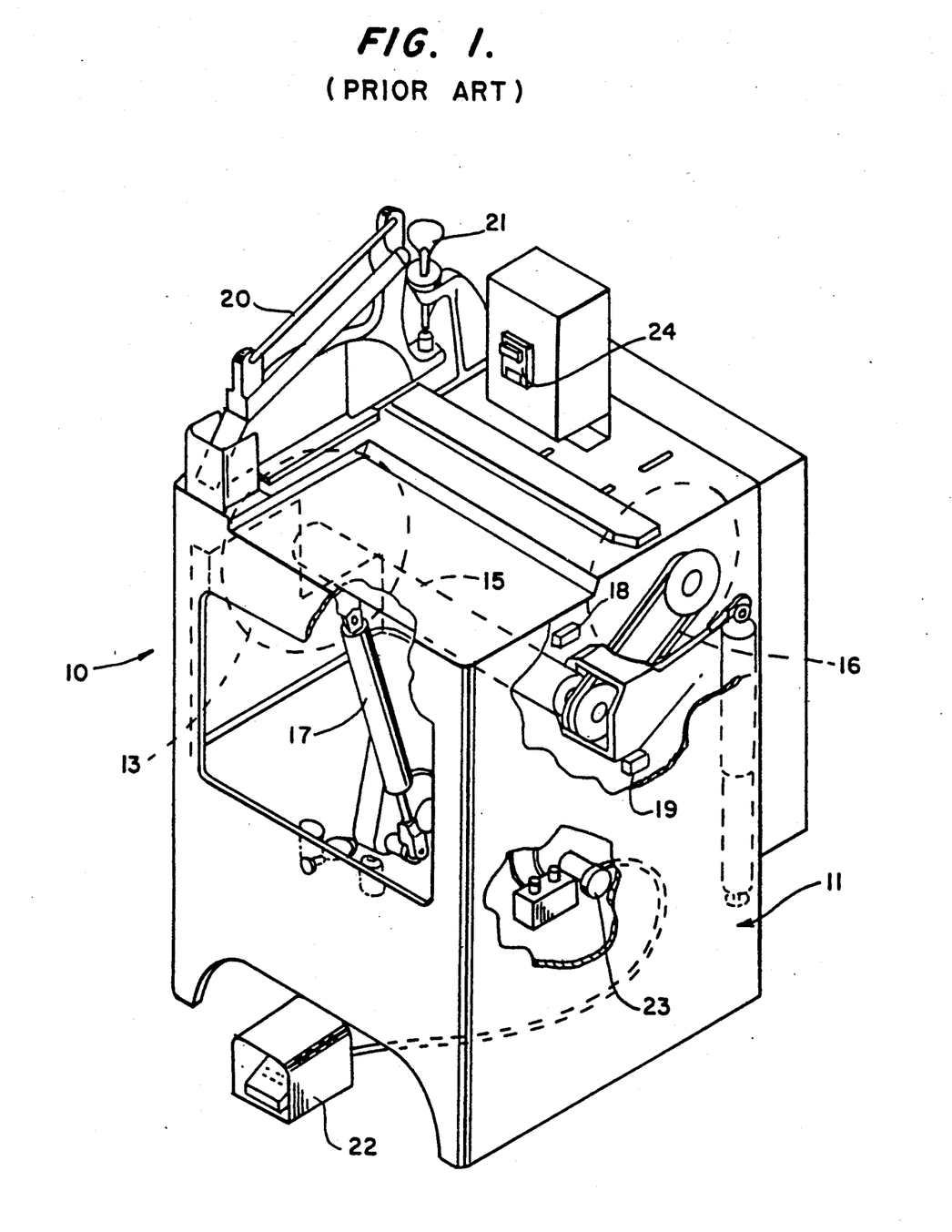
FIG. 1 is a top perspective view, with portions broken away, of a prior art saw incorporating conventional control features.

Referring more particularly to the drawings, a prior art saw of the type with which the present invention is concerned is shown at 10 in FIG. 1. This saw includes a frame or housing 11 having its top surface formed as an infeed table 12. A suitable wood working tool, such as circular saw blade 13 is mounted in the housing for upward movement through a slot 14 to cut or trim a piece of lumber (not shown) positioned to be engaged by the saw. The saw blade is carried on a shaft 15 driven by a belt 16, and is operated up and down into and out of operative cutting position by an air cylinder 17. Limit switches 18 and 19 are positioned to be engaged by the saw mechanism to define the limits of its up and down movements. A hinged guard 20 is positioned to be in covering relationship to the saw blade when it is in its up, operative position for cutting the work piece, and a hand knob 21 is connected to the guard mechanism to adjust the device to different lumber thicknesses. Shielded foot pedal 22 is connected through a suitable control for operating the saw blade up and down. This control includes an electrical interlock 23 for preventing operation of the saw when the power is off. Power to the saw is controlled via a switch 24 mounted on top of the housing.

Figure 2:
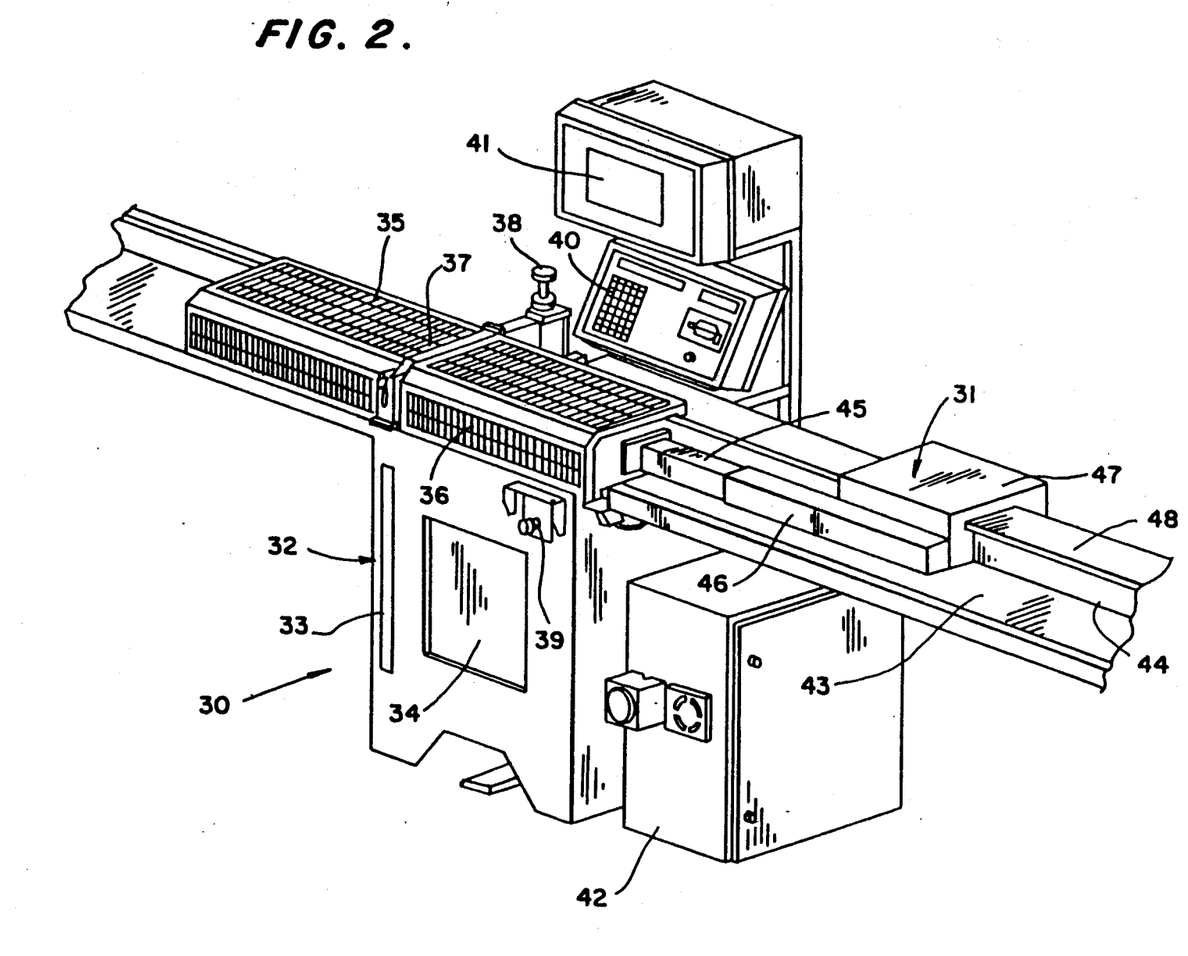
FIG. 2 is a top perspective view, with portions broken away, of a saw having the features of the invention.
Figure 3:
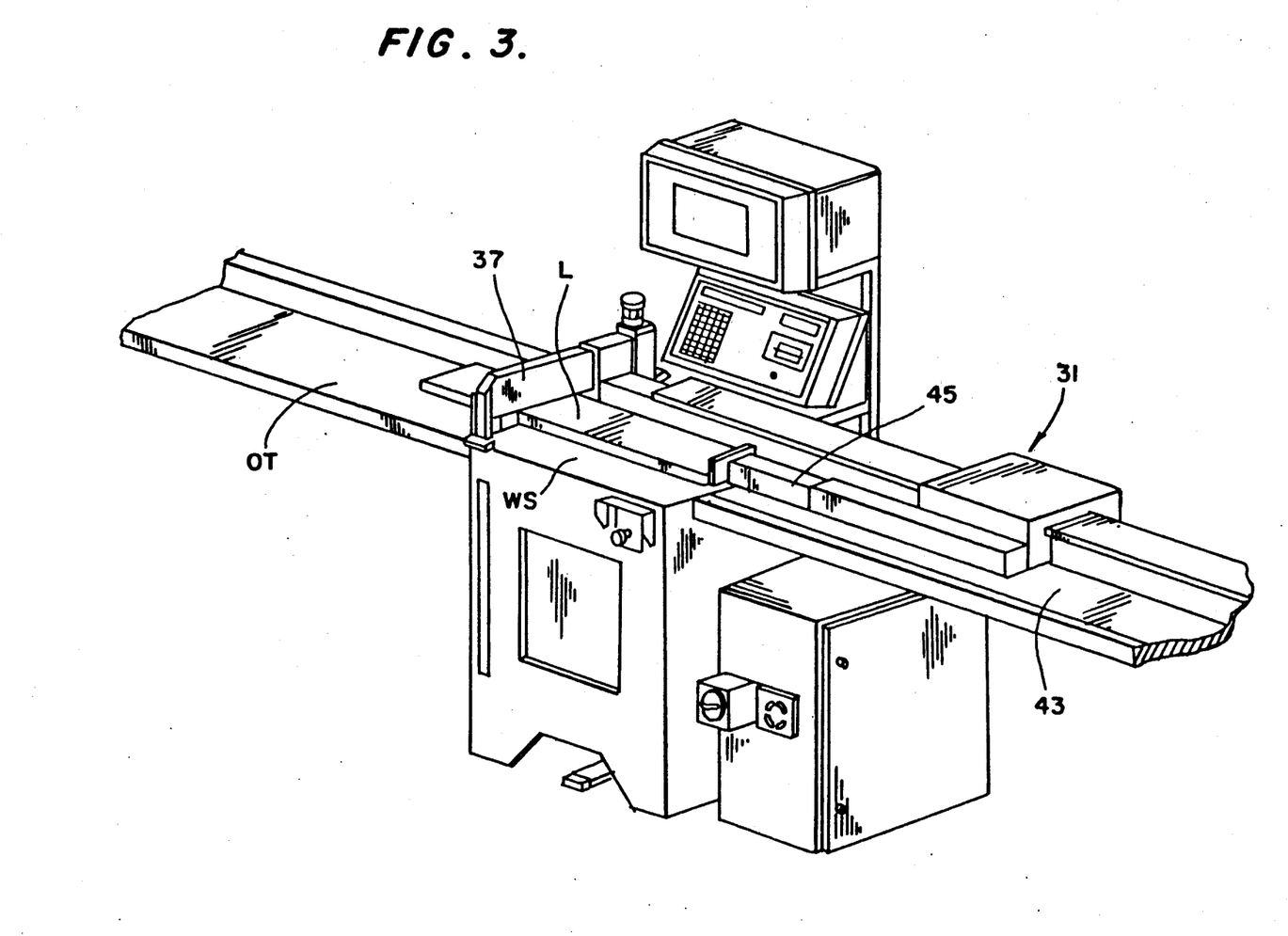
FIG. 3 is a front perspective view similar to FIG. 2, but with the screen guards removed.

A saw according to the invention is shown at 30 in FIGS. 2 and 3, and incorporates a unique push feed system 31, shown more particularly in FIGS. 2-6 and 8. It should be noted that although the push feed system is shown and described herein as applied to a jump saw, it could have utility in other arrangements. Although not shown, the saw 30 incorporates the basic operating features of a conventional saw as shown and described in connection with figure 1, that is, the saw 30 has the same or a similar operating arrangement for the saw blade, including the guard, drive means and depth of cut adjustment as described above, but has a tilted work surface WS and a fence F set perpendicular thereto corresponding to the tilted infeed table surface and fence perpendicular thereto, and, as noted, incorporates the novel push feed system 31 of the invention, described more specifically hereinafter.

As seen in FIGS. 2 and 3, the saw of the invention includes a housing 32 having a saw blade removal port or slot 33 in its front face. An access door 34 provides easy access to the interior of the housing for changing the blade or performing other adjustments and service to the saw. Guard screens or covers 35 and 36 are positioned on top of the housing at opposite sides of the saw blade, and a work piece clamp 37 is arranged to operate between the guards for holding a piece of lumber L in position while it is being cut. Hand knob 38 at the rear of the clamp enables adjustment of the saw for lumber of different thicknesses, and an on-off switch 39 is positioned at the top right hand corner of the front face of the housing.

The saw 30 is computer-controlled from a console or keyboard 40 mounted above the housing at the rear thereof, and a video display screen or monitor 41 enables the operator to observe what is being programmed or keyed into the computer. The power supply and electronics for the saw are mounted in box 42 at one side of the housing.

Pieces of lumber L to be cut are placed on tilted infeed table 43 against fence 44 (see FIGS. 2,3 and 9) and engaged by the push bar 45 of the push feed system 31 to push the lumber onto the work surface or saw table WS where the cut is made. After being cut, the lumber is engaged by a subsequent piece of lumber and pushed onto an outfeed table OT. The push bar 45 is mounted in a push bar housing 46 which is carried by a movable carriage 47 reciprocable on a guide rail 48 positioned at the top of the fence 44. Movement of the carriage and thus the push bar is controlled by the computer as operated by specialized software developed for the saw.

Figure 7:
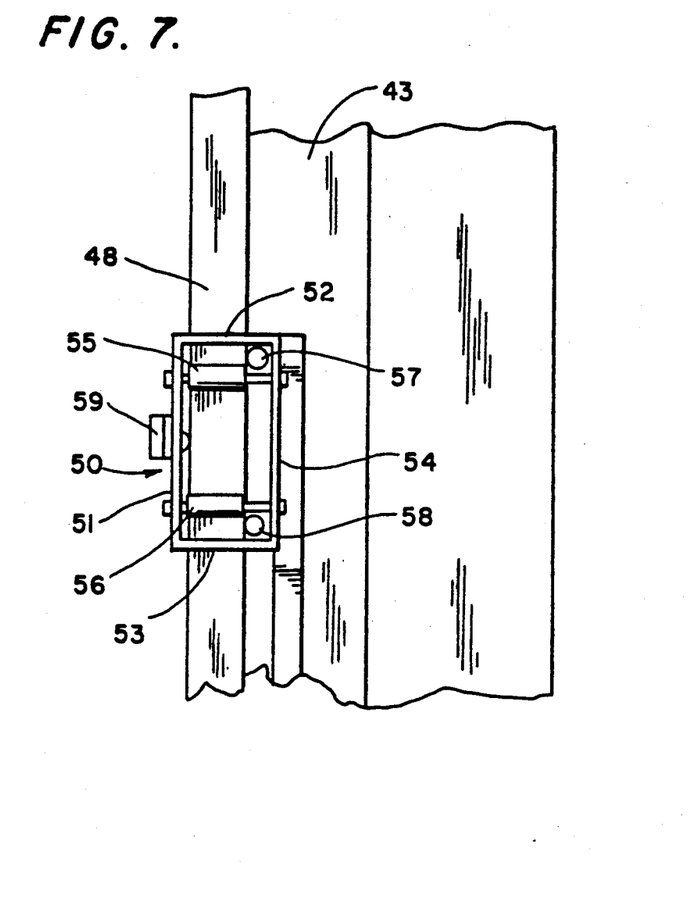
FIG. 7 is a top view, with portions removed for the purpose of clarity, showing the roller support and guide means for the carriage of the invention.
Figure 8:
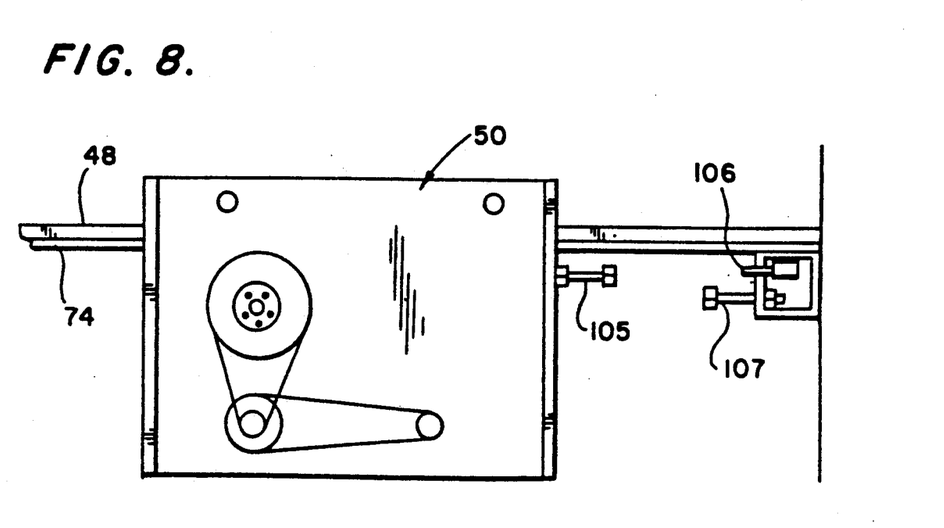
FIG. 8 is a somewhat schematic side view, with portions removed for purpose of clarity, showing the adjustable contact rod and switch means used in calibrating the push feed system at start-up.

The drive means for the movable carriage and push bar is shown in greater detail in FIGS. 4–8. The carriage 47 includes a box-like housing or frame 50 (FIGS. 4 and 6) having a front wall 51, opposite end walls 52 and 53, and a back wall 54. As seen best in FIGS. 4 and 6, the end walls are slotted to receive the guide rail 48, and a pair of transversely extending carriage support and guide rollers 55 and 56 are rotatably supported on the front and back walls in a position to roll on top of the guide rail for supporting and guiding the carriage in its movements along the rail. As seen in FIG. 7, a pair of guide bearings 57 and 58 carried by the back wall 54 engage the side of guide rail 48, and an opposed guide bearing bracket 59 carried on the front wall 51 engages the other side of the guide rail to prevent lateral movement of the carriage on the guide rail during its reciprocating movement.

A stepper motor 60 is mounted on a lower portion of the front wall by mounting bolts or other suitable fasteners 61 extended through slotted openings 62. A toothed drive belt 63 is engaged at one end with the drive shaft 64 of the stepper motor, and is engaged at its other end with one wheel 65 of a reducer. The other wheel 66 of the reducer is in mating engagement with one end of a toothed intermediate belt 67, which is, in turn, engaged at its other end with a toothed intermediate wheel 68. The intermediate wheel is connected through a drive shaft 69 with a first drive wheel 70, and a tractor belt 71 having teeth on both sides is engaged at its opposite ends on a pair of spaced apart drive wheels 72 and 73. An elongate toothed rack 74 on the underside of the guide rail is in mating engagement with the top of the tractor belt, whereby operation of the stepper motor causes movement of the carriage along the guide rail. It should be noted that the reducer and intermediate wheel are mounted to the front plate of the carriage housing through slotted connections (see FIG. 4) which permit adjustment and/or replacement of the belts.

Figure 9:
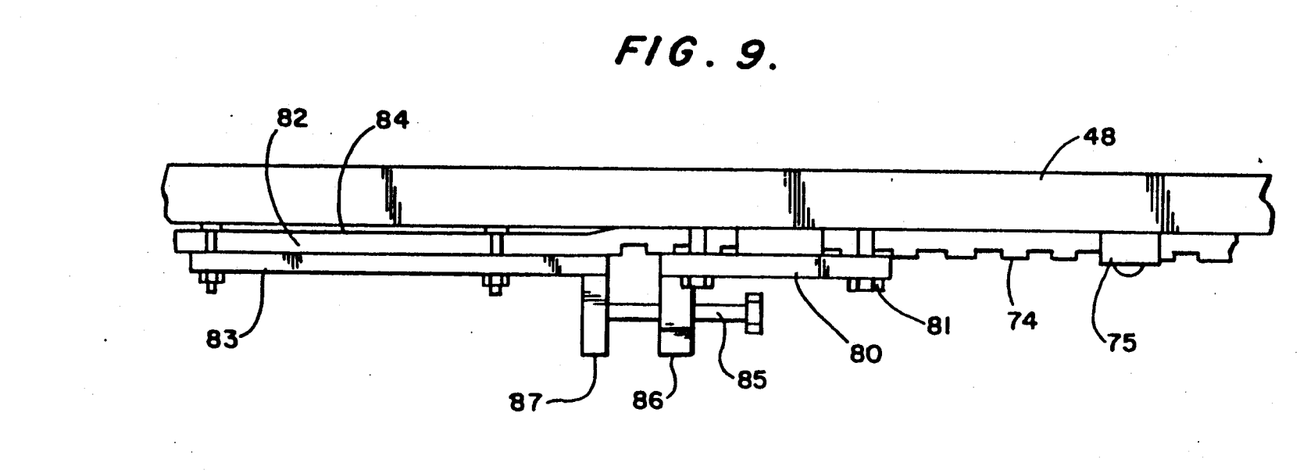
FIG. 9 is a fragmentary side view in elevation of an end portion of the rack for the push feed system of the invention, showing the adjustable feature for tensioning the rack.

The rack 74 may comprise an elongate plastic strip having steel strands embedded therein and secured to the underside of the guide rail. As seen in FIG. 9, the rack is secured to the guide rail only at its opposite ends and is held upwardly against the guide rail by a series of spaced clamps 75, whereby the rack and guide rail have limited axial movement relative to one another, but the rack is secured against vertical displacement relative to the guide rail. This limited axial movement permits calibration of the rack and cooperating carriage at start-up of the system, accomplished through the adjustable reaction bracket 80 attached to an end portion of the rack by suitable fastening means, such as bolts or the like 81. The free end 82 of the rack is secured between a rack end clamp 83 and clamping plate 84. A tension bolt 85 is threaded through a tension bolt bracket 86 fixed to the reaction bracket, and into engagement with a reaction plate 87 fixed to the rack end plate 83. Accordingly, when the tension bolt is adjusted in the bracket 86, the reaction plate 87 and rack end plate 83 are caused to move parallel to the guide rail, stretching the rack and adjusting the position of the teeth thereon, whereby the position of the carriage relative to the saw is changed. This enables adjustment of the number of teeth per unit length.

Figure 10:
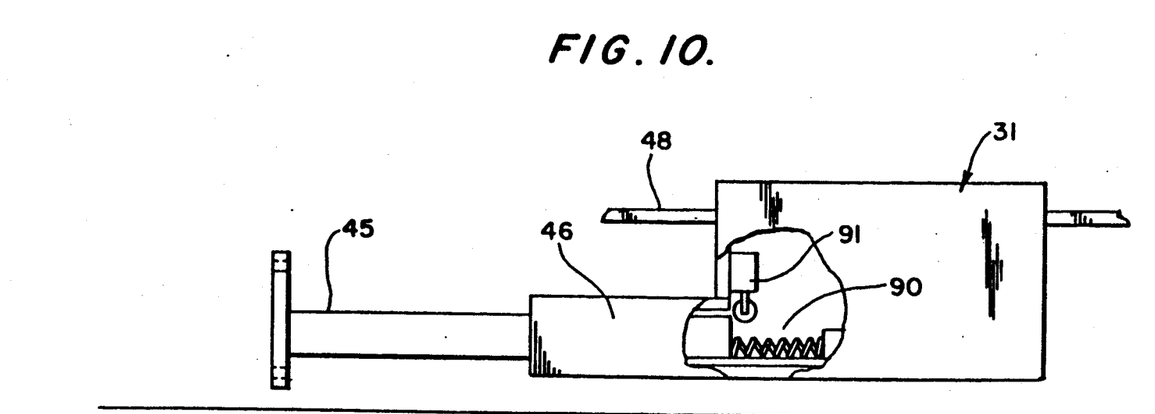
FIG. 10 is an enlarged, fragmentary view in side elevation, with portions broken away, of a the drive means for the push feed system, and showing the shock absorber means for absorbing the impact of the pusher bar against a stationary work piece.
Figure 11:
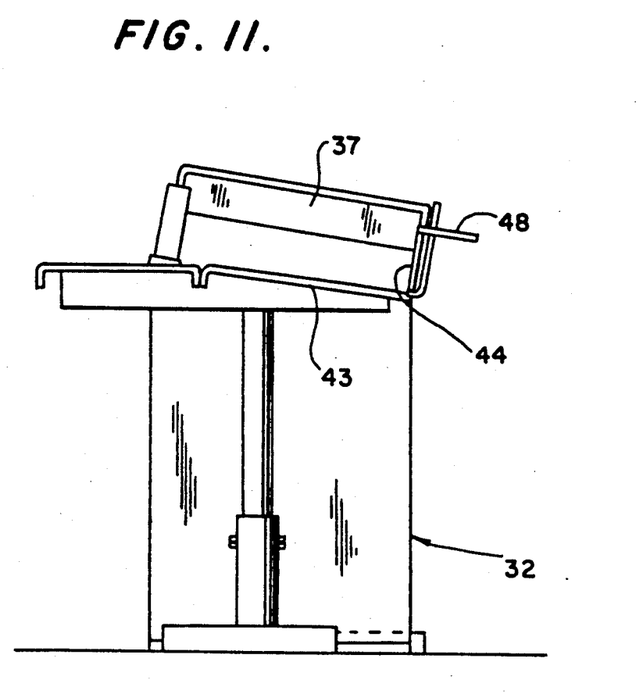
FIG. 11 is a somewhat schematic end view of the saw of the invention, showing the tilted infeed table and fence.
Figure 12:
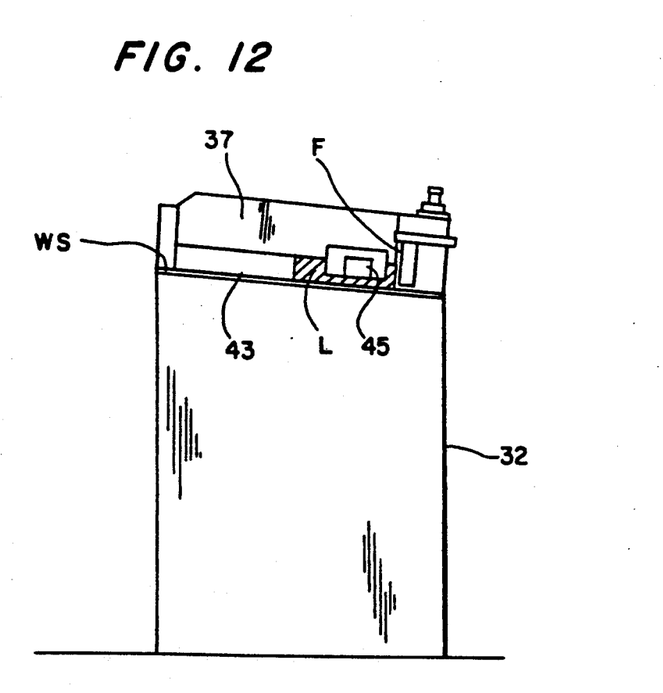
FIG. 12 is a transverse sectional view taken along line 12—12 in FIG. 13, showing the tilted work surface or saw table top and infeed table and its fence.
Figure 13:
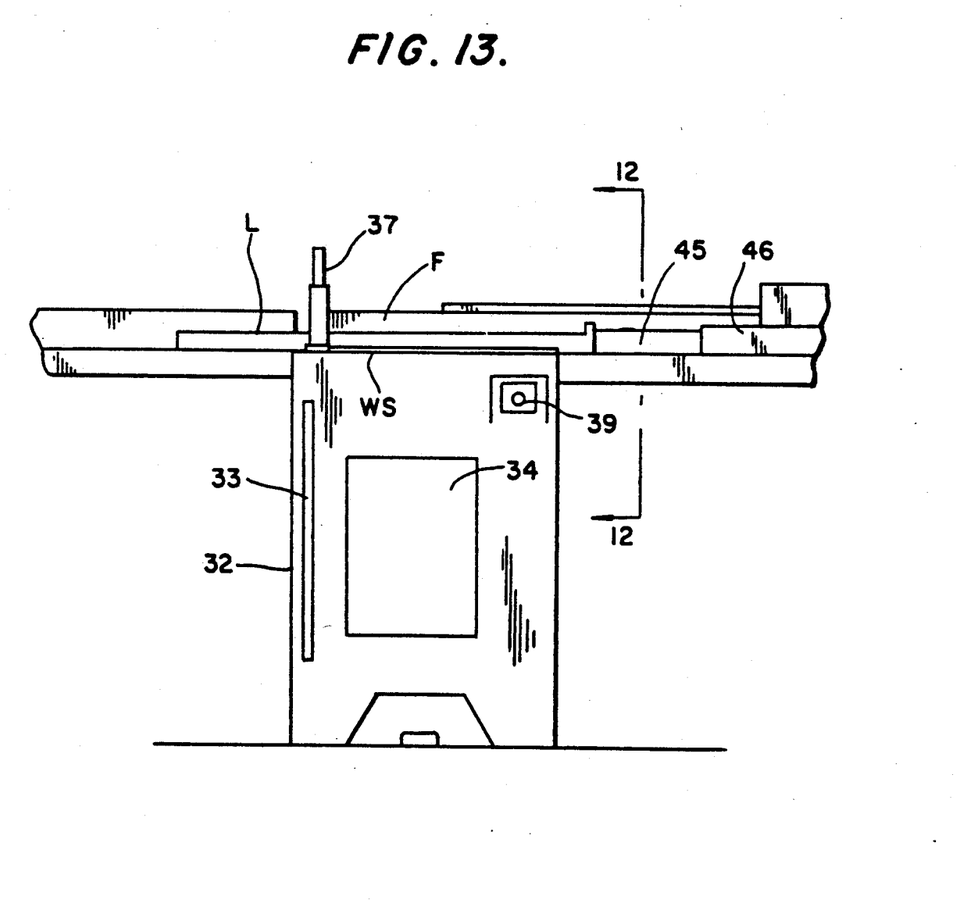
FIG. 13 is a front view of the saw of the invention.

To prevent damage to the system caused, for example, by impact of the push bar against a stationary piece of lumber, a shock absorbing means, such as compression spring 90, is engaged between the end of the push bar and the carriage. See FIG. 10. A limit switch 91 is positioned to be engaged by the end of the push bar whenever compression of the spring occurs and is operative to shut off power to the drive motor. In normal operation, the spring is not compressed.

If desired, a nose piece, not shown, may be mounted on the end of the push bar to accommodate different shapes or configurations of the piece of lumber engaged by the push bar. This nose piece may also comprise a piece of lumber or other soft material (not shown) so that it may engage the saw without damaging the saw.

Figure 4:
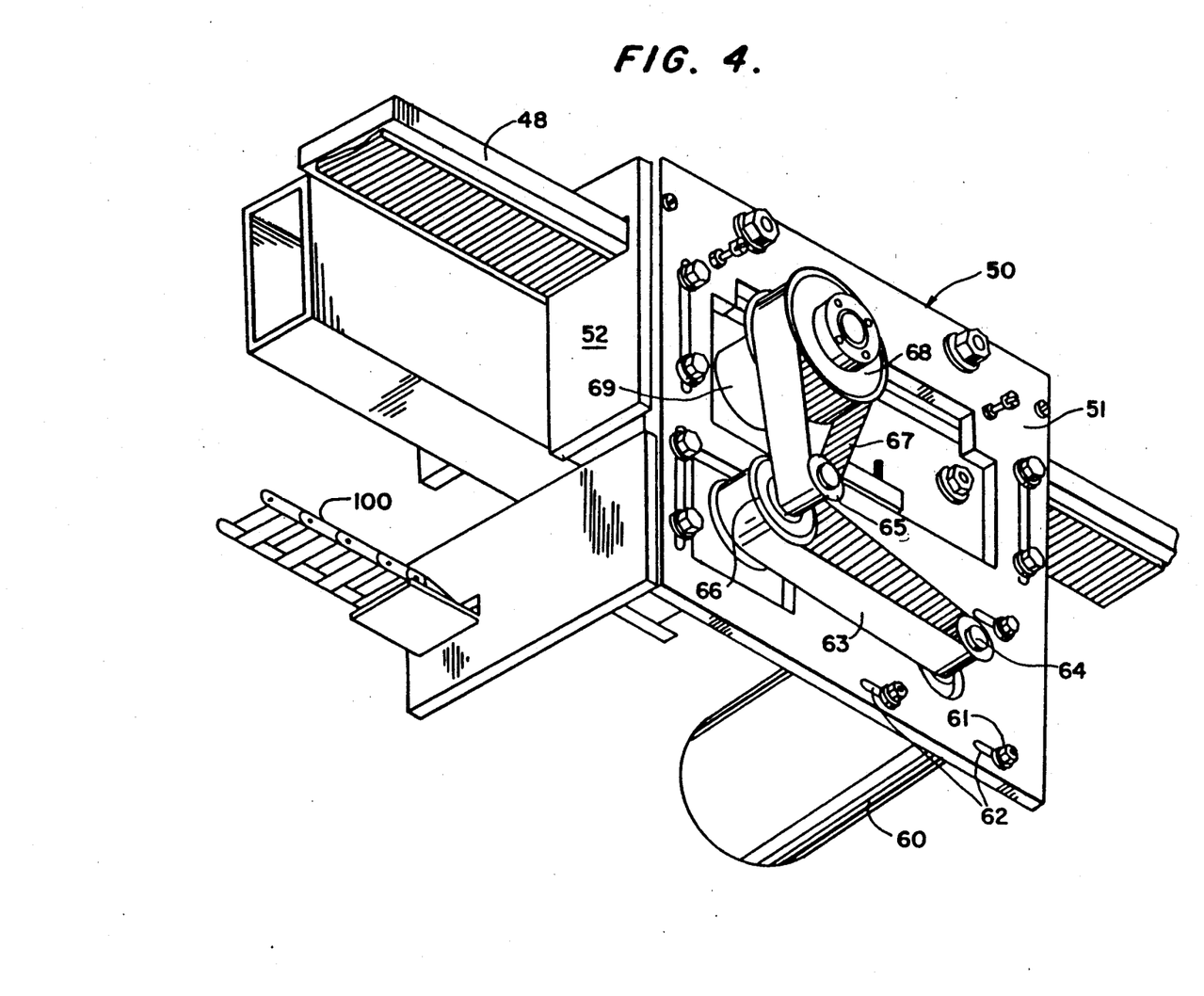
FIG. 4 is a greatly enlarged, fragmentary bottom perspective view of a portion of the push feed system of the invention.
Figure 5:
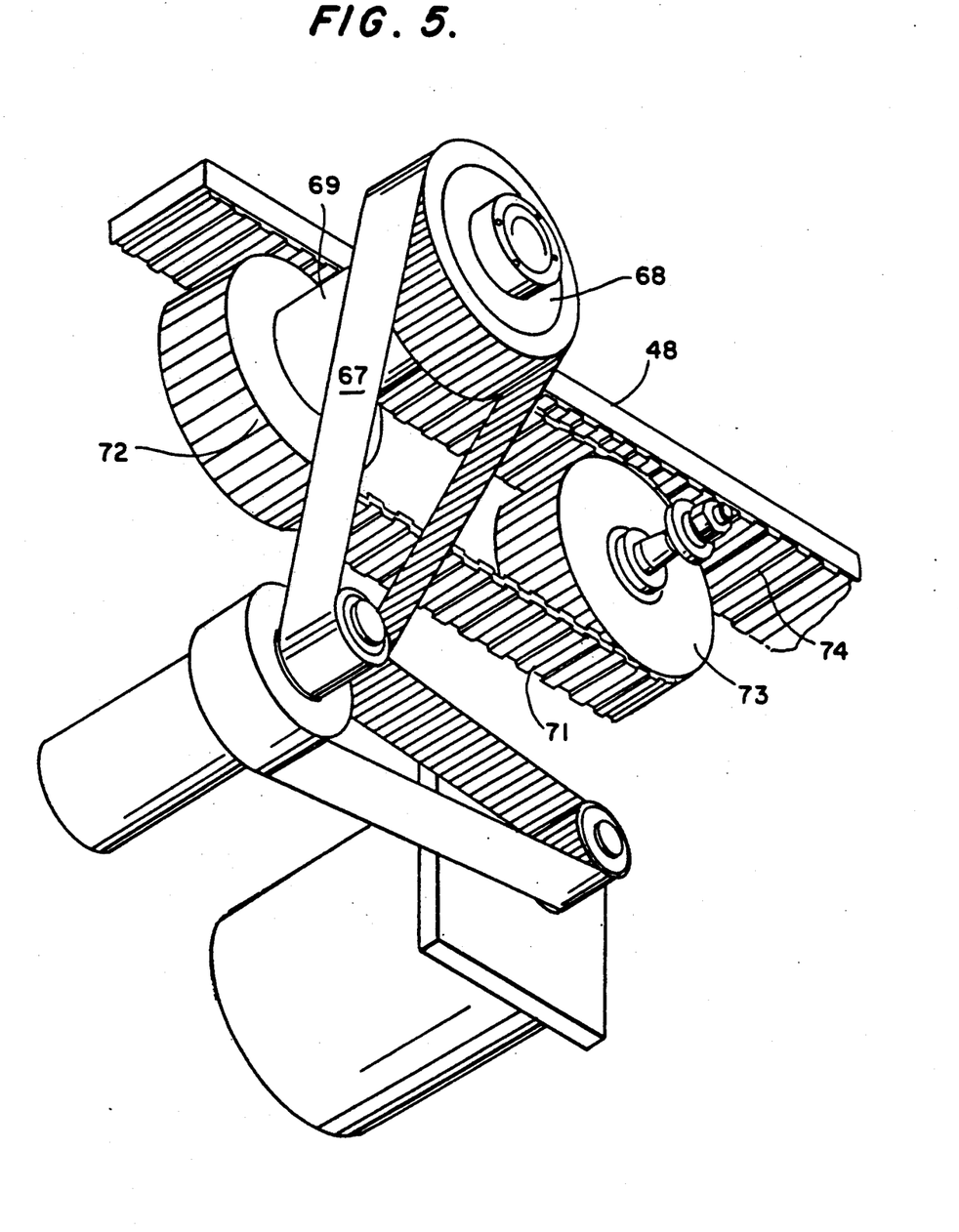
FIG. 5 is a further enlarged bottom perspective view of the principal drive components of the push feed system of FIG. 4, with the housing and other portions removed for purposes of clarity.
Figure 6:
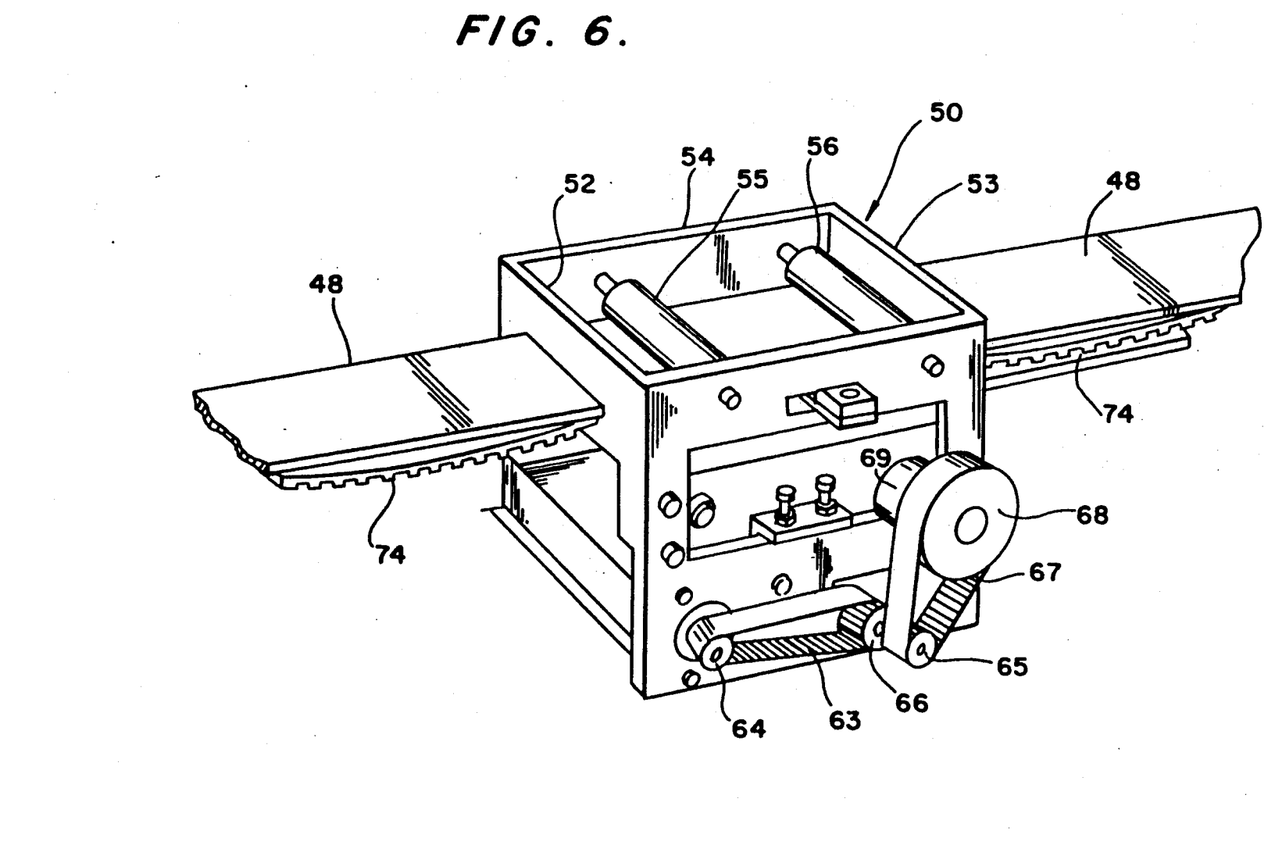
FIG. 6 is a top perspective view of the drive means for the push feed system of the invention, showing the relationship of the rack, guide plate, fence, movable carriage and support rollers.

As seen in FIG. 4, electrical signals may be supplied to the stepper motor by electrical signal support links 100.

Operation of the push feed system is computer controlled, as programmed or keyed in via the keyboard. The software is designed so that a correction factor can be entered into the computer for the length position section, thereby compensating for any deviations that may occur in the number of teeth per unit length of the belts, caused, for example, by manufacturing error or stretching due to use. Correction by this method is effected by positioning the push bar at a specific distance from the cut-off blade, then cutting the material off. The remaining material is then moved toward the saw a specified distance and the material is again cut off. The actual, measured length of the material between these two cuts is compared with the distance specified by the computer program. If there is a discrepancy, the ratio correction factor becomes a part of the drive system program. A further part of the set-up program includes entry into the computer of the width of the saw blade. Thus, each time the saw blade cuts through the lumber, the saw blade width is subtracted from the remaining length of lumber.

At start-up, the drive system is operated to cause the push bar 45 to move toward the saw blade. When the push bar reaches the saw, an adjustable contact rod 105 (FIG. 8) mounted on the push bar carriage frame actuates a datum switch 106 mounted on the saw frame, providing a signal that stops further movement of the push bar. An adjustable limit stop 107 is mounted to engage the carriage and positively stop any further forward movement of the carriage and push bar. The carriage then starts moving away from the saw. At the moment the switch deactivates, the zero reference point is established, thus avoiding making the datum reference a function of the push bar carriage speed.

Further, the software preferably is designed so that the acceleration of the push bar is as rapid as possible without stalling the drive motor, but at the same time the stopping point of the push bar is anticipated and it is controlled so as to follow a deceleration curve that closely matches the load characteristics of the work piece and the friction characteristics of the work piece and the infeed table, causing the work piece to maintain contact with the push bar and eliminating the necessity of having a gripper means on the push bar to hold the work piece in contact with the push bar. As noted previously herein, however, a gripper means may be provided on the push bar, if desired or necessary, to grip the work piece under some conditions Although the invention has been described with reference to particular embodiments, it is to be understood that these embodiments are merely illustrative of the application of the principles of the invention. Numerous modifications may be made therein and other arrangements may be devised without departing from the spirit and scope of the invention.

We claim:

1. A push feed system for feeding successive articles a predetermined distance to a work station for performing work on the articles, comprising:
   a movable push bar for engaging the articles to push them to the work station;
   drive means connected with the push bar for moving it in a predetermined manner to successively engage the articles and advance each of them a predetermined distance to the work station, said drive means including a carriage slidable on a guide rail, said push bar being carried by said carriage for movement therewith, a stepper motor carried by said carriage and connected to drive a toothed belt, and a toothed rack matingly engaged with the belt, said carriage and thus said push bar being moved when the belt moves relative to the rack; and
   control means for operating the stepper motor to move the toothed belt and rack a predetermined distance relative to one another for thereby moving the push bar a predetermined distance, whereby said push bar and the articles engaged thereby are accurately moved in increments according to the spacing of the teeth on the toothed belt and rack and the increments of movement of said stepper motor, and advancement of the articles is halted by cessation of operation of said stepper motor.

2. A push feed system as claimed in claim 1, wherein:
   said stepper motor and toothed belt are mounted on said movable carriage and said rack is mounted to said guide rail.

3. A push feed system as claimed in claim 1, wherein:
   said toothed belt has teeth on both sides thereof and is matingly engaged on its inner side with a pair of spaced apart toothed drive wheels, and matingly engaged on its outer side with said rack.

4. A push feed system as claimed in claim 2, wherein:
   said movable carriage has a front wall, opposite end walls and a back wall; and
   a pair of support and guide rollers extend between the front and back walls in supporting relationship on top of the guide rail, and said toothed belt is engaged with said rack on the underside of the guide rail.

5. A push feed system as claimed in claim 1, wherein:
   said control means has means for adjusting the movement of the push bar so as to compensate for differences between a selected length for a cut piece and the length as actually measured after the piece is cut 6. A push feed system as claimed in claim 6, wherein:
   said control means includes a computer and keyboard, said computer being programmed to advance said push bar a predetermined distance in response to information keyed into the computer via the keyboard.

7. A push feed system as claimed in claim 1, wherein:
   shock absorber means is interposed between said push bar and said drive means for absorbing impacts between the push bar and stationary work pieces.

8. A push feed system as claimed in claim 1, wherein:
   said toothed rack is made of a stretchable material and is mounted so that it can be stretched longitudinally for adjusting the spacing of the teeth, whereby the set point of said toothed belt and thus the push bar on the rack can be adjusted or calibrated.

9. A push feed system as claimed in claim 1, wherein:
   said rack is mounted on the underside of said guide rail and is clamped at one end to a longitudinally adjustable rack end clamp.

10. In a jump saw having a housing with a top and opposite sides, and a saw blade mounted for pivotal movement to and from a position inside the housing to a position exposed for cutting a piece of wood placed on the top, the improvement comprising:
    an automated push feed system for feeding pieces of wood to the saw to be cut, said push feed system including a movable push bar adapted to contact the pieces of wood and push them a predetermined distance to adjacent the saw blade;
    drive means connected with the push bar to move the push bar, said drive means including a step per motor and toothed means connected between the drive motor and push bar; and
    control means operative to advance and then retract said push bar in response to predetermined commands supplied to the control means, said control means being operative to move the push bar and a piece of wood engaged thereby a predetermined distance, and then operative to stop further advance of the push bar and thus to stop further advance of the piece of wood.

11. A jump saw as claimed in claim 10, wherein:
    said drive means includes a movable carriage slidable on a guide rail, said push bar being mounted on said carriage for movement therewith.

12. A jump saw as claimed in claim 11, wherein:
    said toothed means comprise a toothed belt connected thereto; and further comprising
    a toothed rack matingly engaged with the toothed belt; and wherein said stepper motor and toothed belt are mounted on said movable carriage and said rack is mounted to said guide rail.

13. A jump saw as claimed in claim 12, wherein:
said toothed belt has teeth on both sides thereof and is matingly engaged on its inner side with a pair of spaced apart toothed drive wheels, and matingly engaged on its outer side with said rack.

14. A jump saw as claimed in claim 11, wherein:
said movable carriage has a front wall, opposite end walls and a back wall; and
a pair of support and guide rollers extend between the front and back walls in supporting relationship on top of the guide rail, and said toothed belt is engaged with said rack on the underside of the guide rail.

15. A jump saw as claimed in claim 10, wherein:
said control means has means for adjusting the movement of the push bar so as to compensate for differences between a selected length for a cut piece and the length as actually measured after the piece is cut.

16. A jump saw as claimed in claim 15, wherein:
said control means includes a computer and keyboard, said computer being programmed to advance said push bar a predetermined distance in response to information keyed into the computer via the keyboard.

17. A jump saw as claimed in claim 10, wherein:
shock absorber means is interposed between said push bar and said drive means for absorbing impacts between the push bar and stationary work pieces.

18. A jump saw as claimed in claim 17, wherein:
said shock absorber means comprises a compression spring; and
a limit switch means is positioned to be engaged by the end of the push bar whenever compression of the spring occurs, said switch means being operative to cut off power to the drive means.

19. A jump saw as claimed in claim 12, wherein:
said toothed rack is made of a stretchable material and is mounted so that it can be stretched longitudinally for adjusting the spacing of the teeth, whereby the set point of said toothed belt and thus the push bar on the rack can be adjusted or calibrated.

20. A jump saw as claimed in claim 19, wherein:
said rack is mounted on the underside of said guide rail and is clamped at one end to a longitudinally adjustable rack end clamp.

21. A jump saw as claimed in claim 10, wherein:
an infeed table is positioned to receive pieces to be engaged by said push bar for feeding the pieces to the saw to be cut, said infeed table being inclined to the horizontal and having a guide fence perpendicular thereto, said pieces to be cut being held by gravity against said tilted infeed table and fence for proper alignment of the pieces with the saw and with the push bar.

22. In a push feed system for advancing and positioning work pieces relative to a work station, wherein the work pieces are placed on an infeed table and engaged by a push bar to push the work pieces onto a work surface at the work station for work to be performed thereon by a work tool, the improvement comprising:
said infeed table being inclined to the horizontal and having a guide fence disposed perpendicular thereto, defining a juncture for supporting engagement with the work piece to maintain it in alignment with the push bar and to guide it as it is moved along the infeed table to the work surface; and
said work surface being inclined to the horizontal for mating alignment with the infeed table, and having a guide fence disposed perpendicular thereto and in mating alignment with the guide fence on the infeed table, defining a juncture for engaging and supporting the work piece to maintain it in alignment with the push bar and to guide it relative to the work tool, whereby said work piece is held by gravity against the respective tables and guide fences for proper alignment with the push bar and work tool.

23. Positioning means for advancing and positioning a work piece relative to a work station for performing work on the workpiece, said positioning means comprising:
an elongate toothed rack mounted to a frame so as to be stationary;
a toothed belt disposed around spaced apart wheels and supported in contiguous relationship with the toothed rack, at least two adjacent teeth of said toothed belt being in mutually contacting relationship with at least two adjacent teeth of said rack for reducing the reactive loading per tooth and for positioning the rack without backlash, said rack serving as a locating element for the work piece.

24. Positioning means as claimed in claim 23, wherein:
said toothed belt has at least one elongate flight, and said flight is engaged over its length with the toothed rack.

* * * * *